United States Patent
Schneider

(10) Patent No.: US 6,363,487 B1
(45) Date of Patent: Mar. 26, 2002

(54) APPARATUS AND METHOD OF CREATING A FIREWALL DATA PROTECTION

(75) Inventor: Eric D. Schneider, Plymouth, MN (US)

(73) Assignee: Roxio, Inc., Milpitas, CA (US)

( * ) Notice: Subject to any disclaimer, the term of this patent is extended or adjusted under 35 U.S.C. 154(b) by 0 days.

(21) Appl. No.: 09/698,542

(22) Filed: Oct. 26, 2000

Related U.S. Application Data

(63) Continuation-in-part of application No. 09/450,266, filed on Nov. 29, 1999, which is a continuation of application No. 09/105,733, filed on Jun. 26, 1998, which is a continuation-in-part of application No. 09/039,650, filed on Mar. 16, 1998.
(60) Provisional application No. 60/162,500, filed on Oct. 29, 1999.

(51) Int. Cl.$^7$ ................................................ G06F 12/14
(52) U.S. Cl. .................................... 713/200; 713/153
(58) Field of Search ................................ 713/200, 201, 713/202, 151, 152, 153, 166; 714/7; 380/270, 201, 202, 203; 705/57, 58; 711/114

(56) References Cited

U.S. PATENT DOCUMENTS

| | | | |
|---|---|---|---|
| 5,535,188 A | * 7/1996 | Dang et al. | 369/84 |
| 5,598,528 A | 1/1997 | Larson et al. | |
| 5,677,952 A | * 10/1997 | Blakley, III et al. | 380/4 |
| 5,751,936 A | 5/1998 | Larson et al. | |
| 5,802,264 A | 9/1998 | Chen et al. | |
| 5,982,886 A | * 11/1999 | Itami et al. | 380/4 |
| 6,012,145 A | * 1/2000 | Mathers et al. | 713/202 |
| 6,016,553 A | * 1/2000 | Schneider et al. | 714/21 |

* cited by examiner

*Primary Examiner*—James P. Trammell
*Assistant Examiner*—Pierre E. Elisca
(74) *Attorney, Agent, or Firm*—Martine & Penila, LLP

(57) ABSTRACT

A system is disclosed for a protected data storage medium. The protected data storage medium includes a storage medium that includes a protected area. In addition, the protected data storage includes a controller that is capable of controlling access to the storage medium. The controller is also capable of receiving a standard write command to change data of the storage medium, of receiving a special write command to change data of the storage medium. In operation, the controller changes data in the protected area in response to receiving a special write command. However, the controller allows data in the protected area to remain unchanged in response to receiving a standard write command.

20 Claims, 4 Drawing Sheets

APPARATUS AND METHOD OF CREATING A FIREWALL DATA PROTECTION

CROSS REFERENCE TO RELATED APPLICATIONS

The present application claims priority benefit of U.S. Provisional Application No. 60/162,500, entitled "APPARATUS AND METHOD OF CREATING A FILEWALL BETWEEN A PC AND A DISK CONTROLLER TO PROTECT OVERWRITTEN DATA," filed on Oct. 29, 1999, which is incorporated herein by reference.

This application is a continuation-in-part of U.S. application Ser. No. 09/450,266, filed Nov. 29, 1999, entitled "METHOD, SOFTWARE AND APPARATUS FOR SAVING, USING AND RECOVERING DATA," which is a continuation of U.S. application Ser. No. 09/105,733, filed Jun. 26, 1998, entitled "METHOD, SOFTWARE AND APPARATUS FOR SAVING, USING AND RECOVERING DATA," which is a continuation-in-part of U.S. application Ser. No. 09/039,650, filed Mar. 16, 1998, entitled "METHOD, SOFTWARE AND APPARATUS FOR SAVING, USING AND RECOVERING DATA," the entire disclosures of which are incorporated herein by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright © 1999, Wild File, Inc. All Rights Reserved.

BACKGROUND OF THE INVENTION

1. Field of the Invention

This invention relates generally to data protection, and more particularly to low level firewall protection between a host computer and a storage medium.

2. Description of the Related Art

The proliferation of computers in the workforce today has significantly increased the importance of electronic data storage, the loss of which can lead to unacceptable disruptions of operations.

In response, data recovery methods have been implemented to reduce the impact of unexpected data corruption or loss, such as the method disclosed in U.S. application Ser. No. 09/450,266, filed Nov. 29, 1999, entitled "METHOD, SOFTWARE AND APPARATUS FOR SAVING, USING AND RECOVERING DATA." Essentially, these data recovery methods reside between the OS and the storage medium, such as a disk drive, and are generally loaded into host memory at boot up. Through renaming and data redirection, these data recovery methods save old data prior to alteration, thus allowing the data to be recovered. Although these methods provide exceptional data protection once they are loaded into memory, many do not provide data protection prior to being loaded into memory.

As such, many data recovery methods can be circumvented by inappropriate software, such as a computer virus, that can cause writes to the disk drive undetected by the data recovery method. For example, a virus may write to the disk drive at boot up before any data recovery methods are loaded into memory, thus corrupting or deleting recovery data needed for recovering prior states of the disk drive.

Moreover, a user may unintentionally corrupt recovery data by loading software into memory before the data recovery software is loaded. For example, a user may boot up the PC using an "emergency recovery" floppy disk that attempts to overwrite portions of the disk vital to the engine. The process of booting up from a floppy disk is a way in which a user can easily and inadvertently load software that is unaware of any data recovery mechanisms for managing the disk-based data. Thus, without the data recovery mechanism loaded in between the disk and the OS (applications), the data recovery mechanism's disk-based data can be directly altered and thus corrupted.

In view of the forgoing, there is a need for data protection at a hardware level. The data protection mechanism should reduce the ability of inappropriate software access to the storage medium, and provide data protection without needing to be loaded into the host system memory.

SUMMARY OF THE INVENTION

The embodiments of the present invention fill these needs by providing a low level firewall between a host computer and a storage medium. Broadly speaking, a special write command is defined that is configured to be distinguishable from a standard write command. In addition, a protected area of a storage medium is defined. Then, a command to change data in the protected area of the storage medium is received. If the command is a special write command the data in the protected area is changed. However, if the command is a standard write command the data is allowed to remain unchanged.

In another embodiment, a protected data storage medium is disclosed. The protected data storage medium includes a storage medium that includes a protected area. In addition, the protected data storage includes a controller that is capable of controlling access to the storage medium. The controller is capable of receiving a standard write command to change data on the storage medium, and is further capable of receiving a special write command to change data on the storage medium. In operation, the controller changes data in the protected area in response to receiving the special write command. However, the controller allows data in the protected area to remain unchanged in response to receiving the standard write command.

In a further embodiment, a firewall data protection system that protects data stored on a storage medium is disclosed. The system includes a host computer, which is configured to generate a standard write command for changing data on a storage medium, and further configured to generate a special write command for changing data on the storage medium. In addition, the system includes a protected storage medium, which is in communication with the host computer. The protected storage medium includes a storage medium that has a protected area, and a controller that is capable of controlling access to the storage medium. The controller is capable of receiving the standard write command and the special write command from the host computer. In operation, the controller changes data in the protected area of the storage medium in response to receiving a special write command. However, in response to receiving a standard write command, the controller allows data in the protected area of the storage medium to remain unchanged.

Advantageously, the embodiments of the embodiments of the present invention provide data protection for historic data and internal engine data while still providing enough flexibility for use of the protected drive by normal operating systems. Moreover, because the data protection is provided at the micro-controller level, data in the protected area is protected even when the data recover engine is bypassed, such as when a user performs a boot up from an "emergency recovery" floppy disk. In addition, embodiments of the present invention are compatible with existing OS disk controller infrastructures.

Finally, it will become apparent to those skilled in the art that embodiments of the present invention provide a substantial level of protection to a data recovery engine's management of data on the disk and, can be quickly implemented in existing disk controllers. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a firewall protection system that protects data stored in a related storage medium. Broadly speaking, an embodiment of the present invention provides a controller that controls access to a protected area of a storage medium by requiring a special write command to change data in the protected area of the storage medium. Advantageously, the embodiments of the present invention provide a substantial level of protection to the data recovery engine's management of data on the disk and can be quickly implemented in existing disk controllers.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

It should be noted that changing data on the storage medium corresponds to writing new data to the storage medium and modifying data stored on the storage medium. Thus, in the following description the phrase "changing data on the storage medium" will be used to refer to both the above mentioned write operations. Further, although the examples used in the following description refer to use of a hard disk storage device, the embodiments of the present invention may be used with any storage medium wherein data may be changed, such as tape drives, read/write CDs, and RAM.

Figure 1:
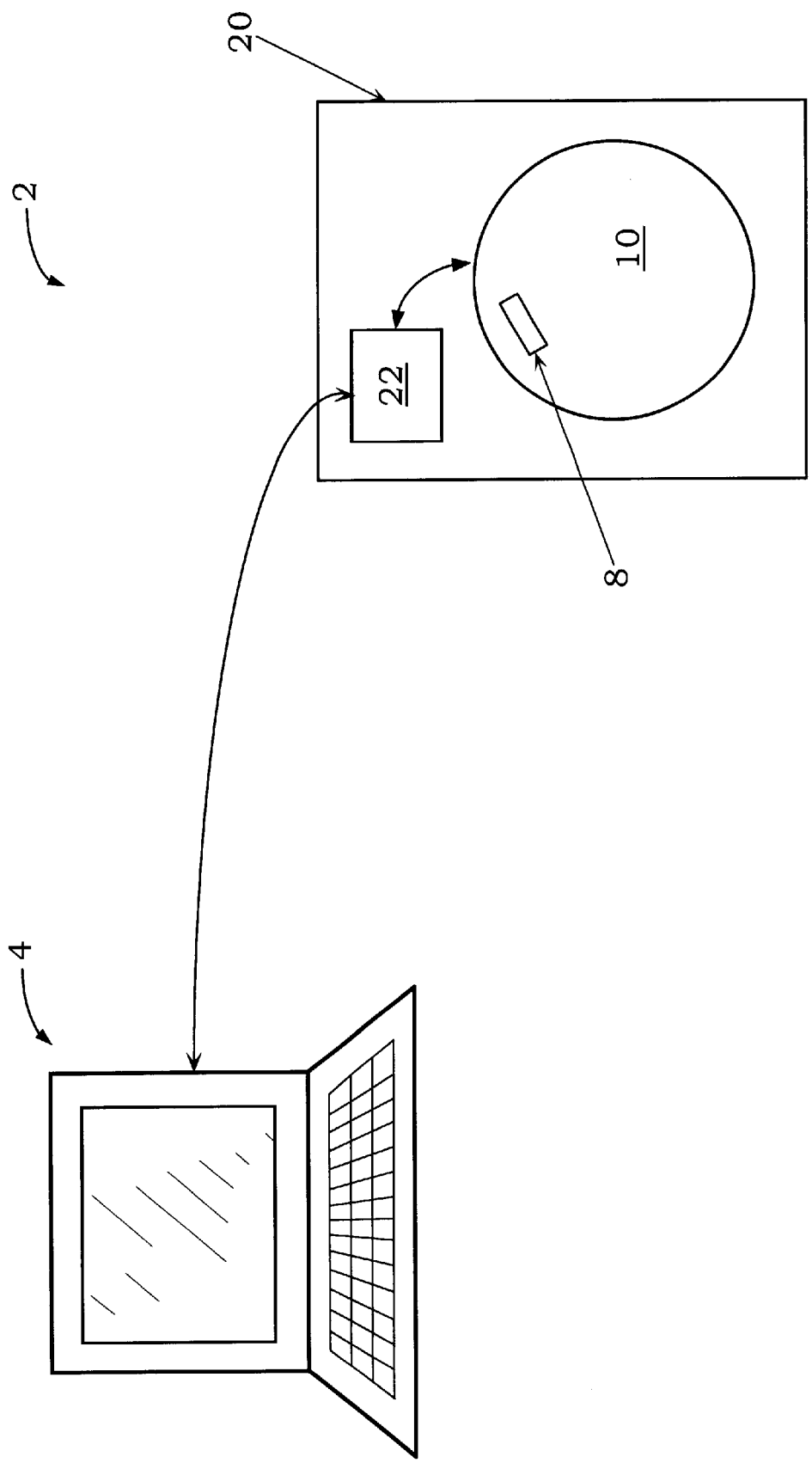
FIG. 1 is an illustration of a firewall protection system, in accordance with an embodiment of the present invention.

FIG. 1 is an illustration of a firewall protection system 2, in accordance with an embodiment of the present invention. The firewall protection system 2 includes a host computer 4 and a disk drive 20 in communication with the host computer 4. The disk drive 20 includes a micro-controller 22 and a disk 10 having operating code 8 for the micro-controller 22.

In one embodiment, the micro-controller 22 includes a small amount of firmware in ROM, which informs the micro-controller 22 of the location of the operating code 8 on the disk 10. In this embodiment, the micro-controller 22 reads the operating code 8 from the disk 10 into a local RAM and executes the operating code 8. In this manner, the operating code 8 can be changed quickly to facility upgrading. Optionally, the operating code 8 can be stored on a ROM, or Flash memory.

The firewall protection system 2 provides a firewall between a general-purpose computer (PC) and the disk drive 20 such that an algorithm protecting the prior states of overwritten data on disk can be protected from corruption. The embodiments of the present invention provide protection for data managed by the data recovery engine (hereinafter "the engine") described in co-pending U.S. application Ser. No. 09/450,266, filed Nov. 29, 1999, entitled "METHOD, SOFTWARE AND APPARATUS FOR SAVING, USING AND RECOVERING DATA," the disclosure of which is incorporated by reference.

The firewall protection system 2 protects disk-based data by introducing a modified protocol such that write requests originating from the engine's software running on the PC can be distinguished from write requests originating from software that is unaware and is going around the engine's management of disk-based data.

To this end, embodiments of the present invention add a special engine-write command to the disk controller's 22 set of commands. Thus, if the disk controller 22 receives a standard write command, the disk controller 22 can recognize that the request did not originate from the engine.

Figure 2:
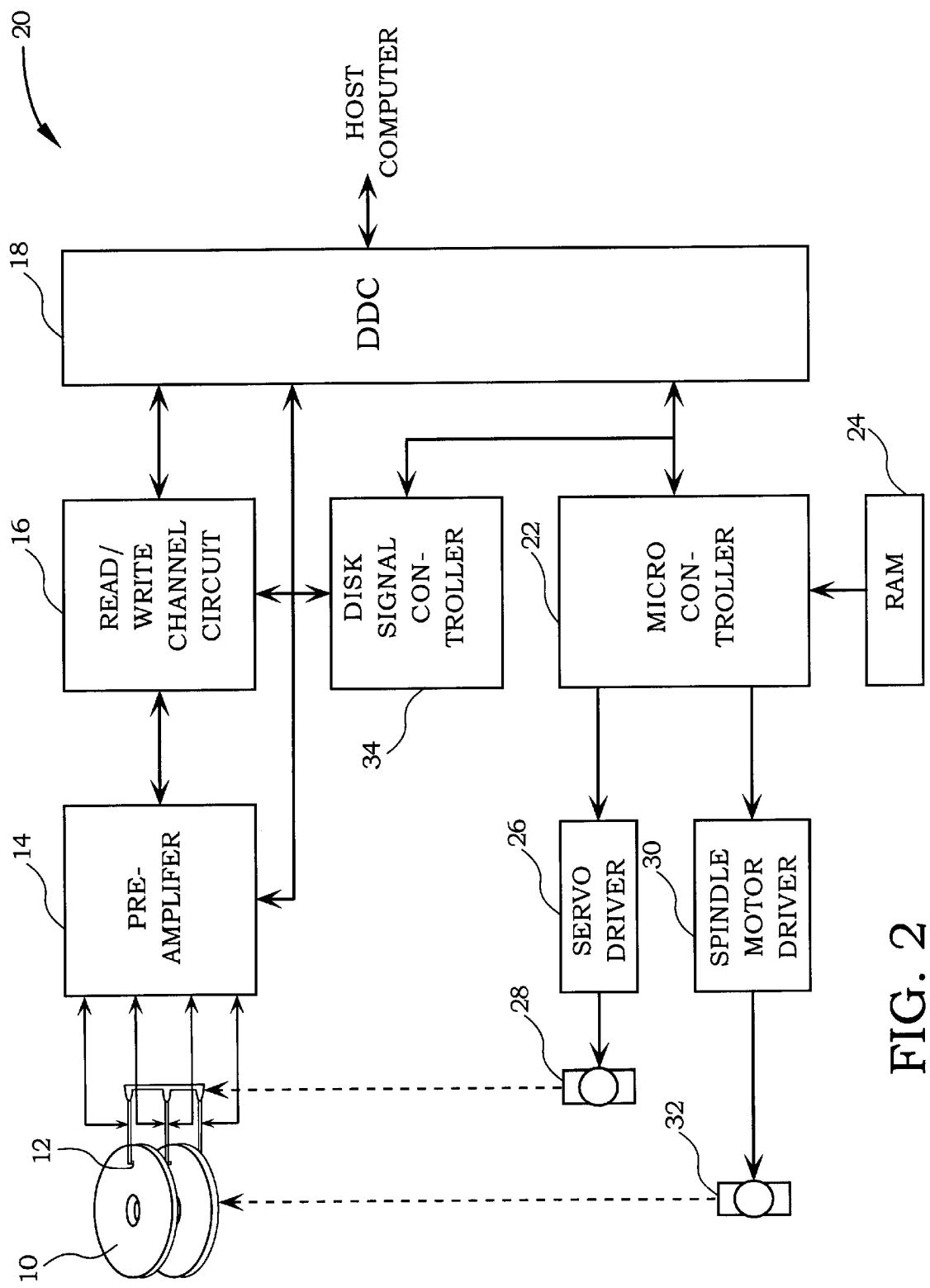
FIG. 2 is a block diagram showing an exemplary protected disk drive, in accordance with an embodiment of the present invention.

FIG. 2 is a block diagram showing a protected disk drive 20, in accordance with an embodiment of the present invention. The disk drive 20 includes data disks 10, read/write heads 12 installed within each disk surface, and a preamplifier 14 coupled to the read/write heads 12. During a read operation, the preamplifier 14 amplifies an analog read signal picked up by the heads 12 and applies the read signal to a read/write channel circuit 16. The read/write channel circuit 16 then detects a data pulse out of a read signal received from the preamplifier 14 and then decodes the data pulse to deliver the same pulse to a disk data controller 18 (hereinafter referred to as "DDC"). During a write operation, the read/write channel circuit 16 applies a write current from the DDC 18 to the preamplifier 14 so as to record the write data onto the disks 10 using the heads 12.

The DDC 18 is provided with a sequencer for performing a sequence of operations according to a micro-program down loaded from a micro-controller 22 and controls a read operation to get data out of the data disks for transmission to the host computer. The DDC 18 also controls a write operation to record data from the host computer onto the disks 10 through the read/write channel circuit 16 and the preamplifier 14. Further, the DDC 18 serves as an interface for data communication between the host computer and the micro-controller 22, in which data communication a buffer RAM 20 temporarily stores the data transmitted therebetween.

The micro-controller 22 controls the DDC 18 in response to a Format/Read/Write command from the host computer.

As stated before, the disks 10 store operation code for the micro-controller 22 as well as various preset values. A servo driver 26 generates a driving current for actuating an actuator 28 responsive to a control signal for position control of the heads supplied 12 from the micro-controller 22. The actuator 28 serves to move the heads 12 on the disks 10 in response to direction and level of the driving current of the servo driver 26.

The disk drive 20 further includes a spindle motor driver 30 that drives a spindle motor 32 to rotate the disks in accordance with a control value for rotation control of the disks provided from the micro-controller 22. Further, a disk signal controller 34 generates decoding of servo information from read data received from the read/write channel circuit 16 and delivers the encoded data to the micro-controller 22. The disk signal controller 34 also generates various control signals for read/write operations under the control of the DDC 18 and the micro-controller 22 and provides these control signals to the preamplifier 14, the read/write channel circuit 16, and the DDC 18. In use, the micro-controller 22 of the disk drive 20 protects data stored on the disks 10 by preventing unauthorized writes operations to protected areas of the disks 10, as discussed next with reference to FIG. 3.

Figure 3:
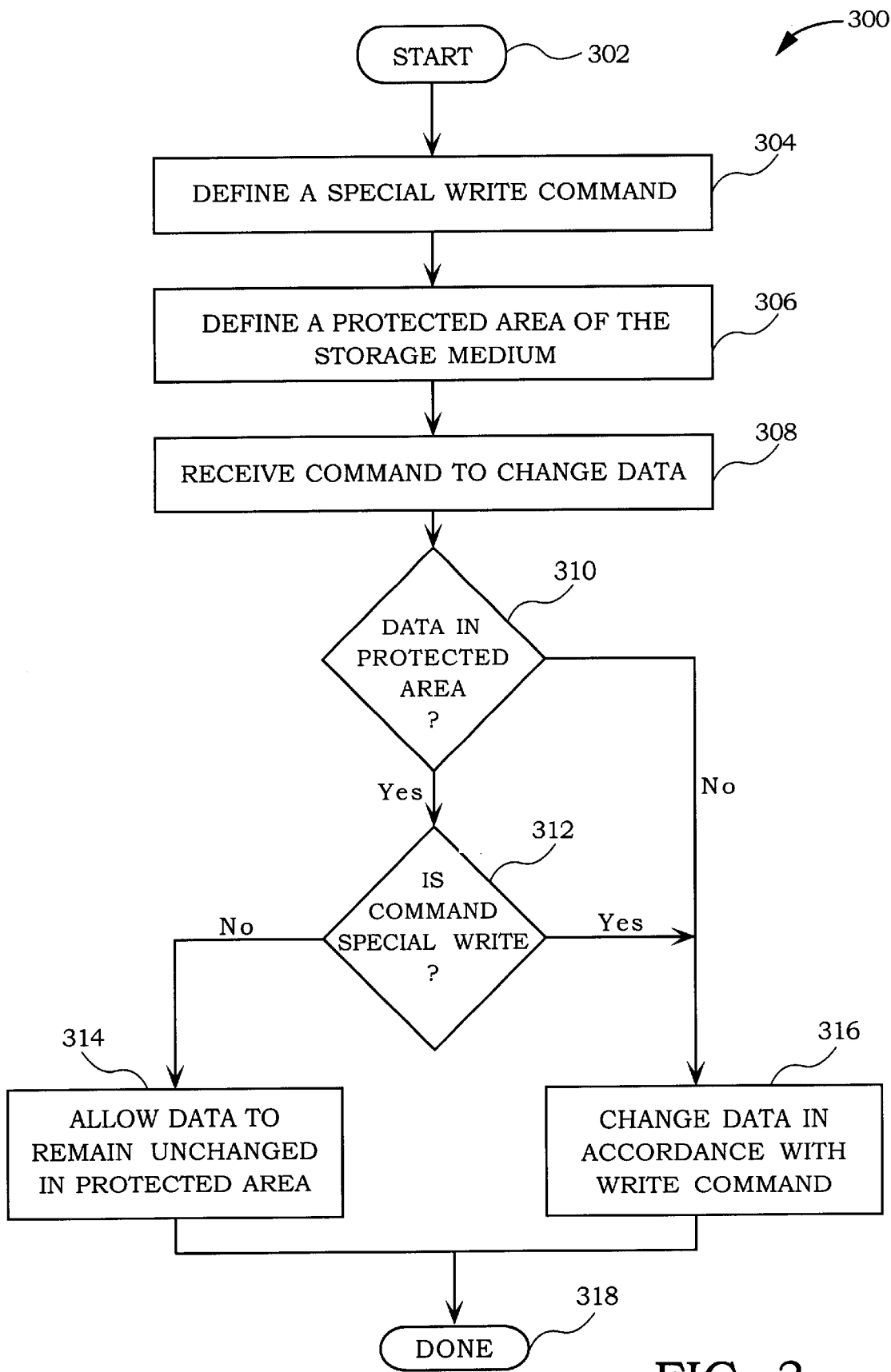
FIG. 3 is a flowchart showing a method for protecting data stored in a protected area of a disk drive, in accordance with an embodiment of the present invention.

FIG. 3 is a flowchart showing a method 300 for protecting data stored on disk of a firewall protected disk drive, in accordance with an embodiment of the present invention. In an initial operation 302, preprocess operations are performed. Preprocess operations include establishing a data recovery engine on a host computer, coupling the firewall protected disk drive to the host computer, and other preprocess operations that will be apparent to those skilled in the art.

In a define special write operation 304, a special write operation is defined. As previously mentioned, embodiments of the present invention protect disk-based data by providing a modified protocol for write request. An additional command is added to the set of commands normally processed by a micro-controller. The additional command is a special write command that is distinguishable from a standard write command. This special write command is then generally only made known to the data recovery engine executing on the host computer.

In this manner, if the micro-controller receives the special write command, the micro-controller knows that the request originated from the data recovery engine. Similarly, if the micro-controller receives a standard write command, the micro-controller knows that the request did not originate from the engine. Thus, the micro-controller can prevent access to protected disk areas from non-engine sources, as described in greater detail below. Hence, a write request originating from the engine's software running on the PC can be distinguished from write requests originating from software that is unaware and is going around the engine's management of disk-based data.

Additional commands may also be defined for the micro-controller during operation 304. These commands can include a test command, enable command, protect command, and disable command. Each of these commands will be described in greater detail subsequently with reference to operation 308.

Figure 4:
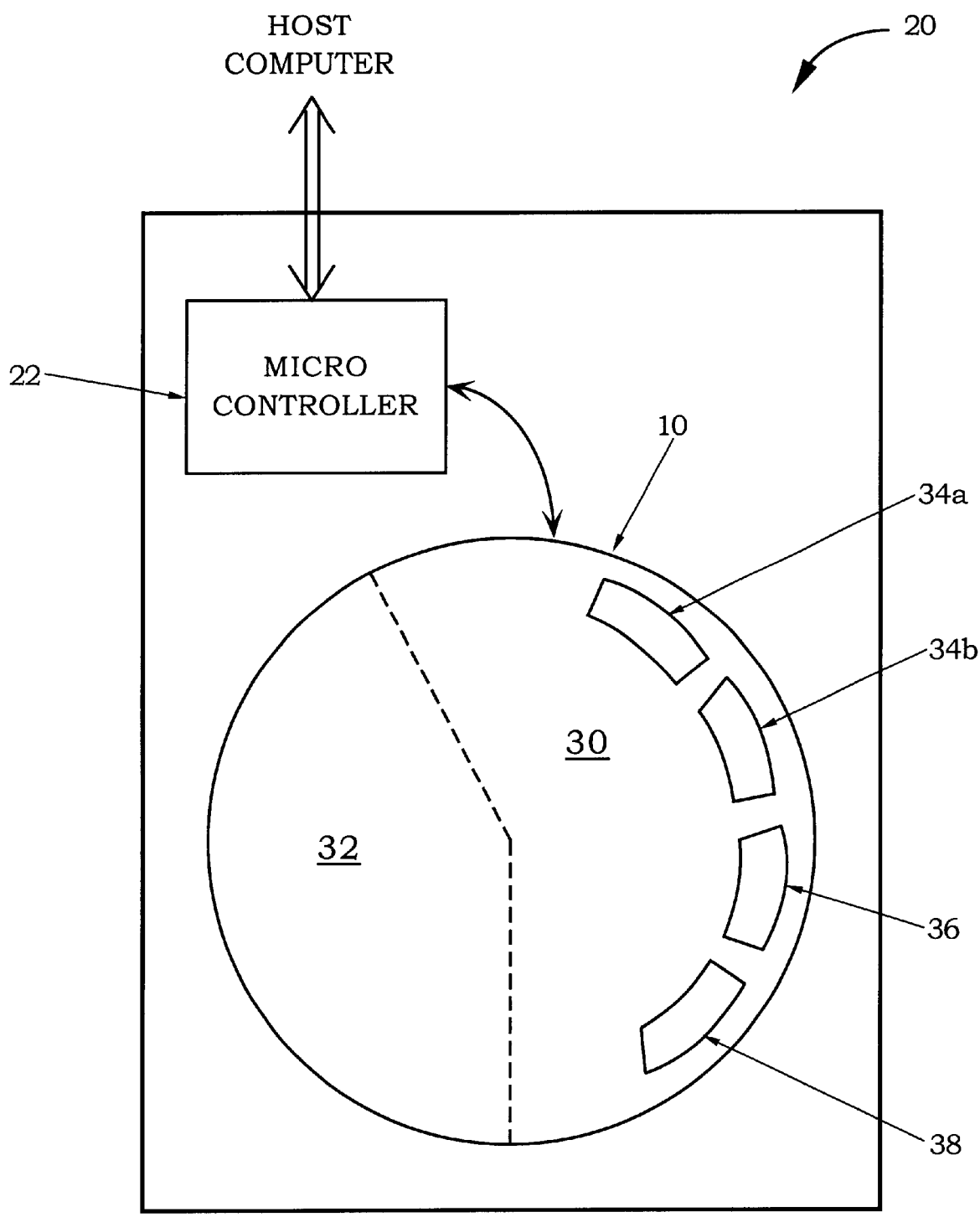
FIG. 4 is a block diagram showing an exemplary protected disk drive including protected and non-protected areas, in accordance with an embodiment of the present invention.

In a define protected area operation 306, a protected area on the storage medium is defined. As shown next with reference to FIG. 4, the micro-controller protects data stored in protected areas of the disk from writes generated from sources other than the engine. FIG. 4 is an illustration showing an exemplary firewall protected disk drive 20, in accordance with an embodiment of the present invention. The disk drive 20 includes a micro-controller 22 in communication with a disk 10. The disk 10 includes a protected area 32 and a non-protected area 30, each of which is defined by the micro-controller 22.

The example of FIG. 4 illustrates a disk 10 having both a protected area 32 and a non-protected area, however, embodiments of the present invention can be configured to have the entire disk 10 protected, or the entire disk 10 unprotected. Since, the protected areas 32 are known to the micro-controller 22, the micro-controller 22 can control write access to the protected area 32 thus preventing alteration of protected data.

Referring back to FIG. 3, a command to change data is received in a receive write command operation 308. Having established the special write command and defined a protected area of the disk, the micro-controller waits to receiving a write command. In addition, during operation 308 other defined commands may be received and acted upon by the micro-controller, such as the test command, enable command, protect command, and disable command.

The test command can be used to detect if the micro-controller supports the protection method of the embodiments of present invention. Feedback is provided to the engine by the micro-controller if the operation is successful. The micro-controller also returns the settings established by the enable and protect commands, discussed subsequently.

The enable command can be used to turn on the protection mechanisms. Once protection is enabled, the protection remains enabled from one power up to another until the protection is disabled or the drive is low-level reformatted. If the protection is enabled then a disk error can be returned if a standard, or otherwise unqualified, write command is received that falls within the protected area.

The protect command can be used during initialization by the engine to establish a list of areas on the disk to which protection applies. Typically, the entire disk is protected. However, in dual boot situations, where there are multiple operating systems in use on one PC, it may be desirable to only protect certain data that is managed by a particular engine supported OS. Thus, another part of a disk that is managed by a non-engine supported OS would be fully under this non-supported OS's control. Note that the protection implemented by the micro-controller is to prevent standard otherwise unqualified writes to certain protected areas of the storage medium. In addition, embodiments of the present invention can hard code the list of areas to protect into the micro-controller. The disable command can be used to turn off the protection mechanism.

When the micro-controller receives a write command, a determination is made as to whether the target of the write is in the protected area defined for the disk. If the target of the write is in the protected area defined for the disk, the method 300 continues with operation 312, otherwise the method 300 continues with a change data operation 316.

In operation 312, a decision is made as to whether the write command is a special write command. The special write command is used by the engine to actually write to protected areas on the disk. The command can be essentially identical to the standard write command but is communicated to the disk controller in a manner such that it can be distinguished from a standard write command. In other words, preferably there is a way of signaling or informing the disk controller that a write command is either standard or "special." If the write command is a special write command, the method continues with the change data operation 316, otherwise the method 300 continues with a protect data operation 314.

In the protect data operation 314, the data in the protected area is allowed to remain unchanged by the received write command. Embodiments of the present invention protect data in the protected areas of the disk by preventing write access to the protected area to non-special write commands, such as the standard write command. Thus, when a non-special write command, such as the standard write command, is received by the micro-controller, the target data in the protected area of the disk is not changed. In one embodiment, the standard write command is ignored and an error message is returned to the host computer. In another embodiment, the standard write command is ignored and a false OK status is returned to the host computer.

In the change data operation 316, the target data of the received write operation is changed in accordance the write command. When a received write command is a special write command or when the target data for the write command is outside the protected area of the disk, the write operation is performed as normal. In this manner, the engine can update the protected and unprotected area of the disk, and normal operating system based writes can update the unprotected areas of the disk.

Post process operations occur in operation 318. Post process operations include receiving additional micro-controller commands and other post process operations that will be apparent to those skilled in the art. Advantageously, the embodiments of the present invention provide data protection for historic data and internal engine data while still providing enough flexibility for drive use by normal operating systems. Moreover, because the data protection is provided at the micro-controller level, the data is still protected even when the data recover engine is bypassed, such as when a user performs a boot up from an "emergency recovery" floppy disk. In addition, as discussed below, embodiments of the present invention are compatible with existing OS disk controller infrastructures.

Generally, existing OS disk controller infrastructures only support standard read and write commands to valid disk locations. To facilitate compatibility with existing OS disk controller infrastructures, embodiments of the present invention communicate "command" information using standard read commands.

Referring to FIG. 4, embodiments of the present invention use standard read commands with a set of predefined disk locations to communicate commands to the micro-controller 22. In one embodiment, two disk locations are specified, such as disk location A 34a and disk location B 34b. The test command is then sent to the micro-controller 22 using a series of read accesses to disk locations A 34a and B 34b. A "binary" sequence of read accesses is the performed, such as:

"AABBBABBBAABBBAABBB"

where an "A" corresponds a read of disk location A 34a, and "B" corresponds to a read of disk location "B" 34b. Since a sequence of reads such as this is unlikely to naturally occur in the real world, the above pattern can be used to signal the micro-controller 22 that the test command is being initiated. Upon detection of the test command pattern, the micro-controller 22 responds to the final read by returning data from a status sector 36 instead of the data that would normally be read.

A byte in the status sector 36 is preferably the complement, or some other variation, on the data that would normally be returned by the read operation. This provides a clear sign to the data recovery engine that the data recovery engine is talking to a micro-controller 22 that supports the protection mechanism of the embodiments of present invention. The status sector 36 can further include additional signature information, which identifies the sector 36 as a valid status sector 36, and identifies the state of the protection mechanism as currently configured.

The remaining commands can be implemented by writing a command sector 38 to a predefined area on disk along with any parameters. The data recovery engine can set up this predefined area by communicating the area's location using techniques similar to how the test command is implemented, i.e., sending data by hiding data in varying read requests.

For performance reasons, it may be desirable to allow standard write commands to be processed into protected areas as long as the engine has used some signaling (command) method to temporarily enable such. For example, the engine can periodically issue an appropriate command that allows the engine to process standard write commands for some short period of time. Embodiments allowing such performance still protect against booting up a PC using an OS/program that does not include the engine.

In one embodiment, performance is enhanced by assuming the micro-controller 22 can buffer up a certain number of standard write requests. Thus, the protection mechanism can operate by having the micro-controller 22 buffer up a series of standard writes and then receive a final authorizing command from the engine that actually allows the writes to occur. Similarly, a pre-authorizing process could be utilized where the engine communicates through a special command to the micro-controller 22 a list of subsequent "qualified" standard writes that should be permitted.

In some cases a PC user may wish to disable (or uninstall) the normal tracking processes of the data recovery engine. However, the engine may have a snapshot of the disk whose preservation is important, as an ultimate fall back should other data on the disk fall into disarray. In this case the engine can re-adjust the protection boundaries to protect only the "file" or otherwise areas on the disk associated with the snapshot and/or the logic that allows the snapshot to be restored.

Note that the protected areas are generally not hidden from the OS. These areas may correspond to files and if so, these files are preferably flagged as un-movable so that general disk de-fragmentation utilities do not attempt to move the data. However, a defragmentation utility that is aware of the protection could adjust the protection areas appropriately as it is re-organizing the disk.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for protecting data stored on a storage medium, the method comprising the operations:

defining a special write command, the special write command being configured to be distinguishable from a standard write command;

defining a protected area of a storage medium;

receiving a command to change data in the protected area of the storage medium;

changing the data in the protected area if the command is special write command; and allowing the data in the protected area to remain unchanged if the command is a standard write command.

2. A method as recited in claim 1, wherein the storage medium is a hard disk drive.

3. A method as recited in claim 1, wherein the storage medium is a read/write CD.

4. A method as recited in claim 1, further comprising the operation of receiving a command to change data in a non-protected area of the storage medium.

5. A method as recited in claim 4, further comprising the operation of changing the data in the non-protected area of the storage medium.

6. A method as recited in claim 1, wherein the protected area is defined to be the entire storage medium.

7. A method as recited in claim 1, wherein the protected area is defined to be a portion of the storage medium.

8. A protected data storage medium, comprising:

a storage medium having a protected area; and a controller capable of controlling access to the storage medium, the controller further capable of receiving a standard write command to change data on the storage medium, the controller further capable of receiving a special write command to change data on the storage medium, wherein the controller changes data in the protected area in response to receiving a special write command, and wherein the controller allows data in the protected area to remain unchanged in response to receiving a standard write command.

9. A protected data storage medium as recited in claim 8, wherein the controller is further in communication with a host computer.

10. A protected data storage medium as recited in claim 9, wherein the host computer generates the special write command and the standard write command.

11. A protected data storage medium as recited in claim 8, wherein the storage medium is a disk drive.

12. A protected data storage medium as recited in claim 8, wherein the storage medium is a read/write CD.

13. A protected data storage medium as recited in claim 8, wherein the storage medium further includes a non-protected area.

14. A protected data storage medium as recited in claim 13, wherein the controller changes data in the non-protected area on the storage medium in response to receiving a standard write command.

15. A firewall data protection system for protecting data stored on a storage medium, comprising:

a host computer configured to generate a standard write command to change data of a storage medium and a special write command to change data of the storage medium; and a protected storage medium in communication with the host computer, the protected storage medium including:

a storage medium having a protected area; and a controller capable of controlling access to the storage medium, the controller further capable of receiving the standard write command and the special write command, wherein the controller changes data in the protected area in response to receiving a special write command, and wherein the controller allows data in the protected area to remain unchanged in response to receiving a standard write command.

16. A firewall protected data system as recited in claim 15, wherein the storage medium is a read/write CD.

17. A firewall protected data system as recited in claim 15, wherein the storage medium is a disk drive.

18. A protected data storage medium as recited in claim 15, wherein the storage medium further includes a non-protected area.

19. A protected data storage medium as recited in claim 18, wherein the controller changes data in the non-protected area on the storage medium in response to receiving a standard write command.

20. A firewall protected data system as recited in claim 15, wherein the micro-controller is further capable of disabling data protection in response to receiving a disable command.

* * * * *